(12) United States Patent
Pauker et al.

(10) Patent No.: US 9,355,389 B2
(45) Date of Patent: May 31, 2016

(54) PURCHASE TRANSACTION SYSTEM WITH ENCRYPTED PAYMENT CARD DATA

(75) Inventors: Matthew J. Pauker, San Francisco, CA (US); Terence Spies, Mountain View, CA (US)

(73) Assignee: Voltage Security, Inc., Cupertino, CA (US)

( * ) Notice: Subject to any disclaimer, the term of this patent is extended or adjusted under 35 U.S.C. 154(b) by 670 days.

(21) Appl. No.: 13/298,708

(22) Filed: Nov. 17, 2011

(65) Prior Publication Data

US 2012/0143770 A1 Jun. 7, 2012

Related U.S. Application Data

(60) Provisional application No. 61/420,277, filed on Dec. 6, 2010.

(51) Int. Cl.

| | |
|---|---|
| H04L 29/06 | (2006.01) |
| H04L 9/32 | (2006.01) |
| G06F 21/00 | (2013.01) |
| G06Q 20/02 | (2012.01) |
| G06Q 20/08 | (2012.01) |
| G06Q 20/12 | (2012.01) |
| G06Q 20/38 | (2012.01) |
| G06F 21/62 | (2013.01) |

(52) U.S. Cl.
CPC ............ *G06Q 20/02* (2013.01); *G06F 21/6263* (2013.01); *G06Q 20/085* (2013.01); *G06Q 20/0855* (2013.01); *G06Q 20/12* (2013.01); *G06Q 20/3823* (2013.01); *G06Q 20/3829* (2013.01)

(58) Field of Classification Search
USPC ............................................. 705/52; 713/171
See application file for complete search history.

(56) References Cited

U.S. PATENT DOCUMENTS

| | | | | |
|---|---|---|---|---|
| 5,590,197 A | * | 12/1996 | Chen | G06Q 20/04 380/30 |
| 7,069,447 B1 | * | 6/2006 | Corder | 713/189 |
| 7,336,788 B1 | * | 2/2008 | Hendricks | 380/239 |
| 7,983,423 B1 | * | 7/2011 | Agarwal et al. | 380/278 |
| 8,041,644 B2 | * | 10/2011 | Ogg et al. | 705/60 |

(Continued)

FOREIGN PATENT DOCUMENTS

| | | |
|---|---|---|
| EP | 2104063 | 9/2009 |
| GB | 2333878 | 8/1999 |

(Continued)

*Primary Examiner* — Dante Ravetti
(74) *Attorney, Agent, or Firm* — Treyz Law Group; Michael H. Lyons; Vineet Dixit

(57) ABSTRACT

Online ordering systems allow a user to submit sensitive information such as payment card information to a merchant in encrypted form. A payment card processor server may be used to provide the user's web browser with code for an encryption function, a cryptographic key, and a key identifier. The web browser may encrypt the payment card information by executing the encryption function and using the key. The encrypted payment card information may be supplied to the merchant over the internet. A key identifier that identifies which cryptographic key was used in encrypting the payment card information may be provided to the merchant without providing the merchant with access to the key. The merchant can forward the encrypted payment card information to the credit card processor server with the key identifier. The processor server can use the key identifier to obtain the key and decrypt the payment card information for authorization.

24 Claims, 8 Drawing Sheets

(56) References Cited

U.S. PATENT DOCUMENTS

| | | | |
|---|---|---|---|
| 8,160,974 B2* | 4/2012 | Schoonmaker et al. | 705/401 |
| 8,234,686 B2* | 7/2012 | Alvermann et al. | 726/1 |
| 8,245,050 B1* | 8/2012 | Subramanian et al. | 713/183 |
| 8,280,043 B2* | 10/2012 | Cerruti et al. | 380/42 |
| 8,280,047 B2* | 10/2012 | Randell | 380/44 |
| 8,306,228 B2* | 11/2012 | Le Saint et al. | 380/278 |
| 8,356,184 B1* | 1/2013 | Meyer et al. | 713/187 |
| 8,411,867 B2* | 4/2013 | Buer et al. | 380/279 |
| 8,423,788 B2* | 4/2013 | Holtzman et al. | 713/189 |
| 8,473,756 B2* | 6/2013 | Orsini et al. | 713/193 |
| 8,495,382 B2* | 7/2013 | Johnson et al. | 713/186 |
| 8,495,746 B2* | 7/2013 | Fissel et al. | 726/25 |
| 8,548,171 B2* | 10/2013 | Mcgrew et al. | 380/277 |
| 8,566,612 B2* | 10/2013 | Davis et al. | 713/189 |
| 8,578,116 B2* | 11/2013 | Chen et al. | 711/163 |
| 8,607,046 B1* | 12/2013 | Silberman et al. | 713/168 |
| 8,607,070 B2* | 12/2013 | Chen et al. | 713/193 |
| 8,656,188 B2* | 2/2014 | Goodwill et al. | 713/193 |
| 2002/0123972 A1* | 9/2002 | Hodgson | G06Q 20/04 705/72 |
| 2003/0042301 A1* | 3/2003 | Rajasekaran | G06Q 20/02 235/380 |
| 2003/0200184 A1 | 10/2003 | Dominguez et al. | |
| 2008/0101596 A1* | 5/2008 | Cerruti et al. | 380/30 |
| 2009/0289106 A1* | 11/2009 | Bishop | G06Q 20/02 235/379 |
| 2011/0119155 A1* | 5/2011 | Hammad | G06F 21/34 705/26.41 |
| 2011/0131635 A1* | 6/2011 | Schneider | H04L 63/1441 726/5 |
| 2011/0161671 A1* | 6/2011 | Whitehouse | G06F 21/6236 713/171 |

FOREIGN PATENT DOCUMENTS

| | | |
|---|---|---|
| WO | 0159731 | 8/2001 |
| WO | 2006081525 | 8/2006 |

* cited by examiner

```
<html>
<head>
<title>Example Checkout</title>
<script src="encryption function.js"></script>     ← 42
<script src="http://card-processor.com/randkey.py"></script>     ← 44
</head>
<body>
    ← 48
<form name="orderform" action="buy.php" method="post">
Credit Card Number:  <input type="text" size=16 maxlength=16 name="CCN"/><br />
                                              ↑ 52                            ↑ 56
<a href="javascript: submitit()">Submit Order</a>     ← 54
</form>
<script type="text/javascript">
function submitit()
{                                                ⎫
   DoEncrypt(document.orderform.elements["CCN"], piekey, piekeyid) ;    ⎬ 60
   document.orderform.submit();                  ⎪
}                                                ⎭
    ↑ 58                           ← 62
</script>
</body>
</html>
```

FIG. 3

PURCHASE TRANSACTION SYSTEM WITH ENCRYPTED PAYMENT CARD DATA

This application claims the benefit of provisional patent application No. 61/420,277, filed Dec. 6, 2010, which is hereby incorporated by reference herein in its entirety.

BACKGROUND

This invention relates to online transactions, and more particularly, to ways to help secure sensitive user data during online transactions.

Online transactions such as purchase transactions often require that a user divulge sensitive information to an online merchant. For example, a user who is purchasing a product from a merchant is typically required to provide a credit card number and other information related to the transaction. This information is generally uploaded to the merchant using a secure web link. The merchant then submits the credit card number to a credit card processor. The credit card processor checks whether the credit card number is authorized. The merchant may then complete the purchase transaction.

Merchants who accept credit card transactions via online e-commerce websites are subject to a long list of requirements outlined in the Payment Card Industry (PCI) Data Security Standards (DSS). To demonstrate compliance with these standards, merchants are often required to submit to annual PCI audits. Ensuring compliance with PCI standards can therefore be burdensome to merchants.

It would be desirable to be able to provide a way in which to ease the burdens associated with compliance with Payment Card Industry Data Security Standards while ensuring that purchase transactions are secure.

SUMMARY

Online ordering systems may be provided that allow a user to submit sensitive information such as payment card information to a merchant in encrypted form in connection with a purchase transaction. The user may use a cryptographic key that is not available to the merchant to encrypt the payment card information, so that the merchant is not able to decrypt the payment information.

To ensure that the encrypted payment card information that was sent to the merchant by the user is valid, the merchant may send the encrypted payment card information to a payment card processor server. The payment card processor server may use the cryptographic key that was used in encrypting the payment card information to decrypt the payment card information. The payment card processor server may then determine whether to authorize the purchase transaction.

Before encryption at the user, the payment card processor server may be used to provide the user's web browser with code for an encryption function, the cryptographic key, and a key identifier. The web page that the user's web browser retrieves from the merchant may include code that requests the encryption function code, the cryptographic key, and the key identifier.

The web browser may gather the payment card information from the user with a text input box or other user interface. The web browser may then encrypt the payment card information by executing the encryption function and using the key. The resulting encrypted payment card information may be supplied to the merchant.

The key identifier that identifies which cryptographic key was used in encrypting the payment card information may be provided to the merchant by the user without providing the merchant with access to the key. The merchant can forward to the key identifier to the payment card processor server when forwarding the encrypted payment card information to the credit card processor server. The processor server can use the key identifier to identify which key was used in encrypting the encrypted payment card information. This allows the processor server to obtain the correct cryptographic key for performing decryption operations. Once the payment card information has been decrypted, the processor server can analyze the payment card information to determine whether to authorize use of the payment card information in connection with the purchase transaction.

Further features of the invention, its nature and various advantages will be more apparent from the accompanying drawings and the following detailed description of the preferred embodiments.

BRIEF DESCRIPTION OF THE DRAWINGS

FIG. 3 shows a sample block of code that may be associated with a web page used in placing an order with a merchant in accordance with an embodiment of the present invention.

DETAILED DESCRIPTION

Online merchants generally accept credit cards and other payment cards as payment for online purchases by a user. In a typical scenario, a user with a web browser uses the browser to access web pages from the merchant's online ordering server. The web pages contain information on products and services (referred to collectively herein as "products"). After locating products of interest, the user may add the products to an online shopping list (often referred to as a shopping cart or shopping bag). As part of the transaction with the merchant, the user may be asked to supply a credit card number. Although the web link over which the credit card number is provided to the merchant is typically secured (e.g., using a secured sockets layer link), the merchant is still able to access unencrypted credit card numbers from numerous customers.

In the event of a security breach, the credit card numbers from these customers may be obtained by an attacker or publically exposed.

Because of the risks associated with this type of security breach, Payment Card Industry Data Security Standards have been promulgated that impose requirements on merchants who process unencrypted credit card numbers. Compliance with these standards may be costly and time consuming.

Figure 1:
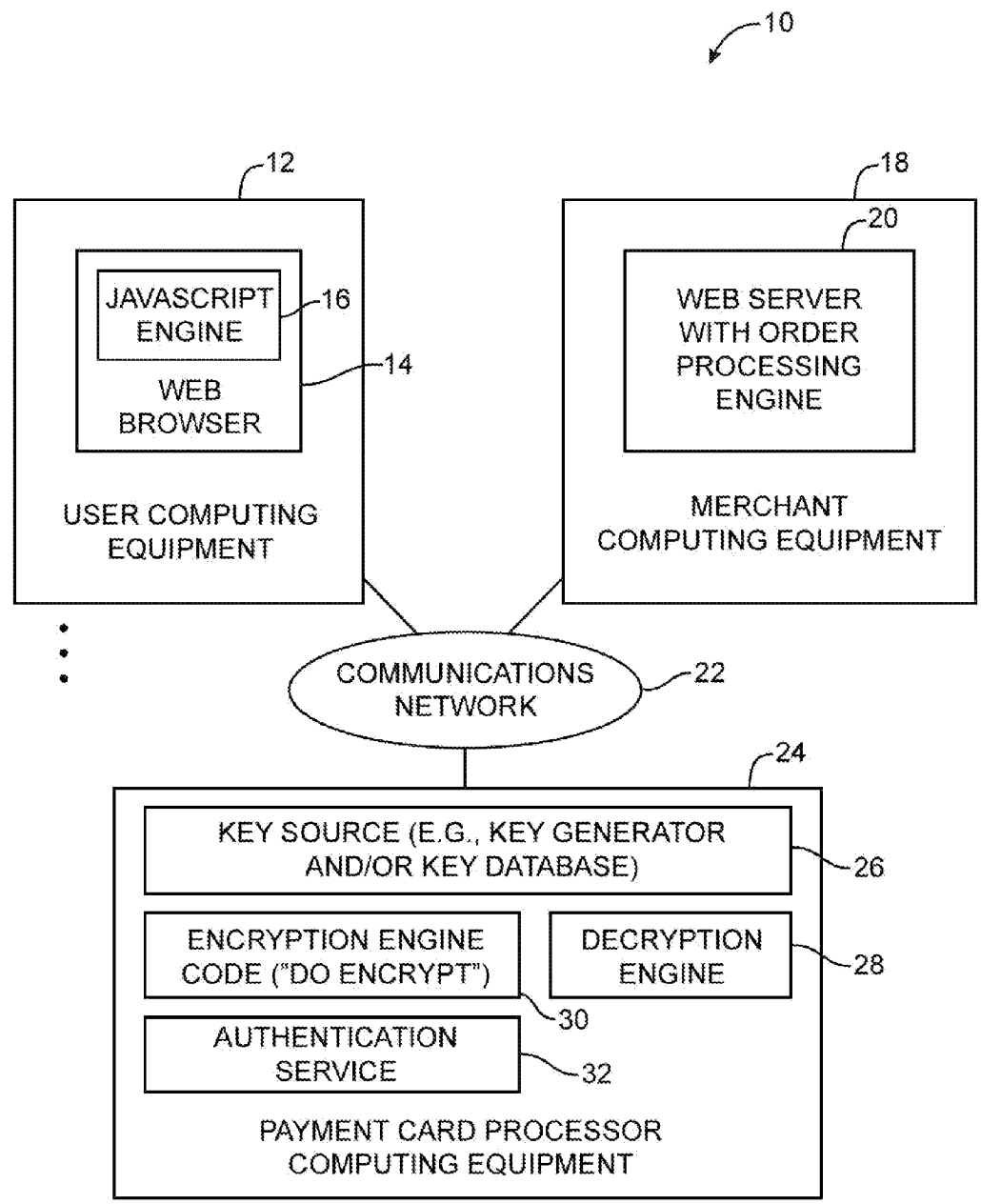
FIG. 1 is a system diagram showing equipment involved in processing an online purchase transaction in accordance with an embodiment of the present invention.

To help reduce compliance burdens, a system of the type shown in FIG. 1 may be used to encrypt credit card data at a user's computer. The credit card data can then be submitted to a merchant in encrypted form. The merchant can obtain authorization to use the credit card number in completing a purchase transaction from a credit card processor (sometimes referred to as a processor gateway, payment card processor, or credit card processor server). In obtaining authorization, the merchant can supply the processor with the encrypted version of the credit card number that the processor decrypts and verifies.

End-to-end encryption arrangements such as this present an opportunity to remove merchants from the scope of annual PCI standards compliance assessments. This is because web server applications at a merchant that do not have access to unencrypted credit card data (e.g., applications that do not have access to cryptographic keys that can be used to decrypt encrypted credit card data) may not be subject to stringent PCI standards compliance assessments.

Using system 10, credit card data can be encrypted in user's browser and transmitted to a merchant. The merchant can submit the credit card data in encrypted form to a processor. The processor can decrypt the credit card data for authorization.

In order to encrypt the credit card data in the user's browser, a cryptographic key is required. That same key must be available to the processor at decryption time, yet kept secret from the merchant.

If desired, the browser can encrypt the credit card number with a locally-generated key that is encrypted with the processor's public key and transferred along with the transaction. In many situations, however, this mechanism may not be optimal, as it requires an additional data element to be included in the transaction. This requirement may make it difficult to implement into existing systems.

As an alternative approach, the user's browser can retrieve a key from the processor. This type of approach can be implemented in such a way that additional data fields are not required.

There are, however, certain challenges associated with retrieving the key from the processor. To ensure compatibility with a wide range of web browsers, it may be desirable for encryption operations to be implemented in a browser via JavaScript, which is the most widely supported programming technology in browsers. However, JavaScript implements a set of strict security rules known as the "same origin policy." These rules require that a JavaScript program loaded from one server may not generally interact with resources from another server. A web page containing JavaScript served by the merchant's web server would therefore not generally be able to retrieve a key from a server managed by the processor.

There are at least two mechanisms by which a web page containing JavaScript from Server A can load and access resources from Server B, thus avoiding the same origin policy restrictions. With a first of these mechanisms, the web page can include JavaScript code located on Server B through the use of the #include directive. This JavaScript code can then be accessed by the JavaScript code in the web page served by Server A. With a second of these mechanisms, the web page can include a Cascading Style Sheets (CSS) file located on Server B either through use of the <link> tag or the @import directive. Elements in this CSS file can then be accessed by the JavaScript code in the web page served by Server A.

Using one of these techniques, the user's browser can retrieve a cryptographic key from the processor, which can then be used to encrypt the credit card data prior to submission to the merchant. The processor may operate a key server that can dynamically generate the JavaScript loaded as part of the include. The included JavaScript may consist of either a set of variable assignments that declare variables for a key and corresponding key ID, and assign values to those variables, or a full set of encryption routines that have the key and key ID variables set within that code.

The processor key server (sometimes referred to as a key generator) may have at least two functions. The first is the publically accessible "get key", which returns the JavaScript with a randomly generated (or derived) key and key id. Each call to that function may return a different key. The second is a private "map key id to key" function that is preferably only accessible to the processor. This function may enable the processor to decrypt the payload of a transaction encrypted with the results of a previous "get key" operation. Note that "get key", rather than being a generic API call, may be invoked via JavaScript include.

The processor key server may support multiple methods for insuring system security. Among these are: rate limiting "get key" calls, Rate limiting "get key" calls on a per-IP basis, requiring some type of authentication on the "get key" call, and creating different classes of keys on a per-merchant basis. The processor key server may also return a certificate or public key to be used to encrypt traffic (or encrypt a key subsequently used to encrypt traffic.) In this case, the key can be cached on the browser so that the key server does not need to be called on every transaction.

In a typical transaction, a web browser of a user is used to access a payment page on a merchant server. In response, the merchant server returns the payment page, which may include a JavaScript #include directive referencing a URL on the Processor Server. Alternatively, the payment page may include a CSS <link> tag or @import directive referencing a URL on the Processor Server. The user's browser may automatically retrieve data from the URL as part of the standard page load. The retrieved data may include a cryptographic key for use in encryption operations. Following an on-screen prompt, the user may enter credit card data into the payment page (e.g., a web form). Prior to submission of the credit card information (e.g., via HTTP POST) to the Merchant Server, JavaScript included in the payment page may encrypt the credit card data using the key that was retrieved from the processor.

For security, it may be preferable that the key be unique (or nearly unique) for a given transaction (i.e., a single key should generally not be used for multiple transactions). In order to have access to the correct key at decryption time, a key reference may be included in the transaction information sent to the Processor. There are at least two possible mechanisms that can be used. With the first illustrative mechanism, the URL included in the payment page includes a key reference. This key reference is preferably already included in the credit card transaction and transmitted to the Processor as a transaction ID. With the second illustrative mechanism, the data returned by the processor to the user includes a key reference. The key reference may be chosen by the processor (e.g., at random). This key reference may then be included in the credit card transaction, either as an additional field, or embedded into the encrypted credit card.

The processor can generate the key using any suitable process. For example, the key can be randomly generated and stored in a database with the associated key reference or the key can be mathematically derived from a master key and the key reference (e.g., using an HMAC).

Any suitable encryption algorithm may be used in encrypting the credit card data. For example, the Advanced Encryption Standard (AES) encryption algorithm may be used, a stream cipher may be used, or simple addition may be used (e.g., to encrypt the credit card number by adding the key to the credit card number digit-by-digit). With another suitable approach, a format-preserving encryption (FPE) encryption algorithm may be used such as the FFX mode of AES. The use of an FPE encryption algorithm may allow the structure of the encrypted data to be preserved (versus traditional encryption approaches which render the encrypted data into a binary field). If desired, the key reference (sometimes referred to as the key identifier or key ID) may be embedded into the encrypted data. This may be accomplished by expanding the encrypted value either in length (adding extra characters) and/or in character set (e.g., converting some of the characters from numeric-only to alphanumeric or other expanded character space). To preserve desired merchant processing functions, it may also be desirable to ensure that certain elements of the card are not encrypted. For example, the last four digits of a credit card number may be left unencrypted to enable the merchant to display receipt information.

As shown in FIG. 1, system 10 may include one or more users at user computing equipment 12. Each user may have a web browser 14 or other client software that is capable of requesting and displaying web pages for a user. Users may be individuals, companies, or other entities. Web browser 14 may include JavaScript engine 16 or other browser resident programming language or execution environment. The use of JavaScript in the equipment of FIG. 1 is sometimes described herein as an example.

User computing equipment 12 may communicate with merchant computing equipment 18 and payment card processor computing equipment 24 using communications network 22.

Payment card processor computing equipment 24 (or other transaction processor computing equipment associated with a transaction processor such as a card processor or other entity) may be implemented using one or more computers at one or more geographic locations (e.g., one or more servers). A payment card processor or other entity that can determine whether or not an online financial transaction such as an online credit card purchase should be authorized or declined may be associated with computing equipment 24. Payment card processor computing equipment may, for example, be used in implementing a server that is associated with a third party payment card processing service or a credit card company's payment care processing service.

Merchant computing equipment 18 may be associated with a merchant such as an on-line merchant or other entity that accepts sensitive information from users such credit card numbers.

Communications network 22 may include local area networks, the internet, wired and wireless networks, and other suitable communications paths. Computing equipment 12, 18, and 24 may be implemented using personal computers, workstations, handheld devices, servers that are based on one or more computers, or other suitable computing equipment.

Merchant 18 may include a web server and order processing engine 20. The web server at merchant 18 may be used for serving web pages to user 12 over network 22. The web pages may include product information that a user can use to identify a product of interest. The product (which may include tangible products and services such as online services and other services), may be added to an online shopping cart when the user clicks on on-screen options that are presented to the user on computing equipment 12 using browser 14. As part of the order process, the user is presented with one or more web pages that contain data entry fields requesting payment card data. The requested payment card data may include a credit card number, a Card Verification Value (CVV), a credit card expiration data, etc. The user may also be asked to submit personal information such as the user's home telephone number to assist with order processing. When a user submits an order for processing, the order processing engine at the web server may obtain uploaded order information from the user including the user's payment card data over network 22.

To ensure that the credit card data is not available in unencrypted form at the merchant, the user's browser (e.g., JavaScript engine 16) may encrypt the credit card data and other sensitive information. For example, the user's browser may encrypt all or part of the credit card number—sometimes referred to as the PAN, the CVV, the expiration date, other payment card information, and other personal information that is used for payment processing and that is not needed by the merchant for order fulfillment (e.g., personal information associated with the user other than personal information that the user must provide to the merchant to receive the ordered product such as shipping address information). In performing encryption operations, the user's browser may obtain code for implementing an encryption function at equipment 12 from processor 24 (e.g., encryption engine code 30) and may obtain key data such as a cryptographic key and an associated key ID from key source 26. Key source 26 may contain a key generator (key server) that uses an associated master secret to generate random keys and associated key IDs that uniquely identify each key in real time. If desired, keys and key IDs may be generated in advance and stored in a database in key source 26.

When the order is submitted from the user to the merchant, the user's browser may provide the encrypted credit card number and the key ID to the merchant. The key ID may be submitted as part of the same upload process that is used to upload the credit card number, as a separate upload, or may be embedded within other information. For example, the key ID may be embedded within the encrypted credit card number during the encryption process (e.g., by adding digits to the credit card number or by encoding the credit card number in a character space that is larger than its original character space).

Web server and order processing engine 20 may request that processor 24 ascertain whether the user is authorized to make the requested purchase. In particular, engine 20 may submit a credit card purchase authorization request to the processor over network 22. The request may include the encrypted credit card number and other personal information in encrypted form that was provided to merchant 18 by user 12. The request may also include the key ID (key reference). Processor 24, which may be a server associated with a different domain than the web server of the merchant, may receive the authorization request over communications network 22.

Processor 24 may use the key ID to generate a local version of the key (using the key generator in key source 26) or may use the key ID to retrieve a copy of the key from a key database in key source 26. After using the key ID and source 26 to produce the key, processor 24 may use decryption engine 28 and the key to decrypt the encrypted credit card number and other encrypted information provided in the authorization request from the merchant. The processor may then use authentication service 32 to determine whether to authorize the requested purchase transaction. Service 32 may, for example, determine whether the user's credit card number is valid, whether the user's credit card number and CVV match, whether the card has expired, whether the telephone number that the user provided as part of the submitted order matches the telephone number on record with the user's credit card company, whether the requested purchase amount is lower than the amount of available credit on the card, and other card verification operations and fraud detection operations to determine whether or not to authorize the purchase transaction.

The result of these checking operations may then be presented back to the merchant over network 22. For example, processor 24 can inform merchant 18 that the requested transaction has been authorized. In addition to indicating that the requested purchase transaction has been approved, processor 26 may provide merchant 18 with information (i.e., a token) that identifies the approved credit card number for the merchant. The merchant can retain the token for later use in transactions involving the same credit card (e.g., refund processing, product exchanges, etc.).

Figure 2:
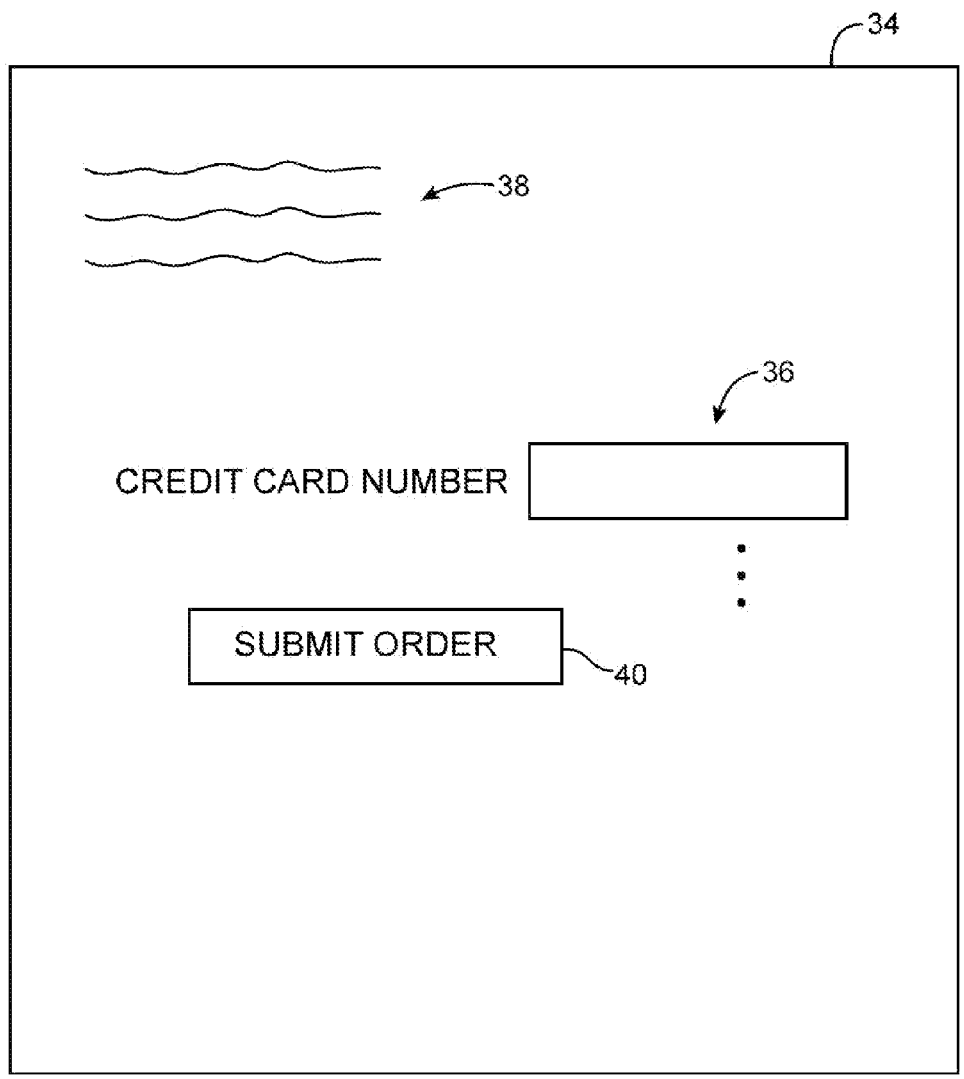
FIG. 2 is a diagram of an illustrative web page that may be used in submitting an order as part of a purchase transaction in accordance with an embodiment of the present invention.

FIG. 2 shows an illustrative web page of the type that may be presented to a user during the process of making a purchase from merchant 18. As shown in FIG. 2, web page 34 may include ordering information 38 (e.g., information confirming shipping details and shopping cart contents) and one or more text entry boxes such as box 36. User interface elements such as box 36 may be used to gather information related to the user's purchase (credit card number information, CVV information, personal information such as a telephone number, etc.). In a typical ordering system, numerous pages are provided to the user to assist the user in completing an order. For example, one or more pages may be provided to the user to confirm the user's billing address, shipping address, shopping cart contents, gift options, payment card details, etc. The example of FIG. 2 is merely presented as an example.

Web page 34 may contain user-selectable options. For example, web page 34 may contain user-selectable on-screen options such as submit order option 40. Options such as option 40 and other user input interface elements may be selected by a user when the user desires to submit an order to merchant 18 over communication network 22. Web page 34 may contain a markup language form (i.e., an html form) that allows the user upload the contents of text box 36 and other information associated with the page to web server and order processing engine 20 at merchant 18 (e.g., using a POST command) in response to user selection of submit order option 40. When the upload process is initiated, JavaScript engine 16 may be used by browser 14 to encrypt the user's credit card number and other sensitive information using encryption engine code 30 from processor 24 and using the key obtained from key source 26 at processor 24. Following encryption, the browser may upload the encrypted data, and the key ID to merchant 18. The merchant does not receive the key from the user, so the merchant is not able to decrypt the credit card number.

Illustrative JavaScript code corresponding to a web page of the type shown in FIG. 2 is shown in FIG. 3. This JavaScript code is provided to the user's browser when the user browses to web page 34 while shopping on the merchant's web site (web server 20) over network 22 and is processed using JavaScript engine 16.

Code 42 contains a page title (i.e., the title of the order web page provided by web server 20 at merchant 18). Code 44 is used to include the document "encryption_function.js" into web page 34 by reference. The document "encryption_function.js" contains the code (code 30) for the encryption function used by browser 14 and is obtained by browser 14 from processor 24 over network 22 when engine 16 processes the code of web page 34 (i.e., the code shown in FIG. 3). The encryption function is called "DoEncrypt" in the present example. Code for the DoEncrypt function (code 30 on processor 24 of FIG. 1) is maintained within the document "encryption_function.js". Code 44 serves to retrieve the code for DoEncrypt code 30 from processor 24 so that this code is included in web page 34 and is available for use by JavaScript engine 16, when the DoEncrypt function is called. The encryption function may implement any suitable encryption algorithm. For example, the encryption function code for DoEncrypt may be used to implement a one-time pad or may be used to implement a stream cipher. As an example, if the sensitive information to be encrypted (e.g., a payment card number) is a 16 bit number, the encryption function (i.e., a one-time pad function) may direct the user's browser to add a 16-bit cryptographic key to the sensitive information. In a stream cipher arrangement, a key stream may be generated from the key and added to the credit card number or other sensitive information. Use of code 30 that implements a stream cipher or a one-time pad is merely illustrative. Code 30 may be used to implement any suitable encryption operation, if desired.

Code 46 is used to retrieve the document "randkey.py" from the computing equipment of processor 24 (identified as "card-processor.com" in this example). The document "randkey.py" includes the key (called "piekey" in the FIG. 3 example) and key ID (called "piekeyid" in the FIG. 3 example) that are provided by key source 26 of FIG. 1.

In the example of FIG. 3, JavaScript code has been used to request the key, key ID, and encryption function. If desired, Cascading Style Sheet code may be used to request the key and key ID (and engine 16 may include Cascading Style Sheet engine capabilities).

Code 48 is the name of the html form that is being used for data uploading. Code 50 specifies the destination page on the server of merchant 18 to which the form contents are uploaded. Code 52 specifies the upload method (the POST command in this example).

Code 54 is an html command used to obtain the credit card number from the user (i.e., the contents of box 36 of FIG. 2). Additional lines of code such as code 54 may be provided to gather information such as CVV values, user telephone numbers, etc.

Code 56 is used to draw "submit order" button 40 on page 34. Code 58 invokes the encryption function "DoEncrypt" that was incorporated by reference using code 44. Parameter 60 corresponds to the credit card number. Piekey corresponds to the key. Piekeyid corresponds to the key id. During encryption operations (i.e., when running DoEncrypt), the original (unencrypted) version of the credit card number is encrypted using the cryptographic key. The DoEncrypt function writes over the original credit card number parameter with the resulting encrypted version of the credit card number (i.e., DoEncrypt replaces the credit card number with the encrypted credit card number).

Code 62 directs browser 14 to post (upload) the form elements from the form "orderform" to merchant 18 (i.e., web server and order processing engine 20) over communications network 22. The uploaded form elements include the encrypted credit card number and any other information encrypted using the DoEncrypt function. The key ID is also preferably uploaded. With one suitable arrangement, the value of the key ID (i.e., piekeyid) is uploaded with the encrypted credit card number. With another suitable arrangement, piekeyid is embedded into the encrypted credit card number by DoEncrypt (e.g., by adding extra characters to the credit card number to carry the key ID and/or by expanding the character space in which the credit card number is represented to accommodate the embedded key ID information).

Figure 4:
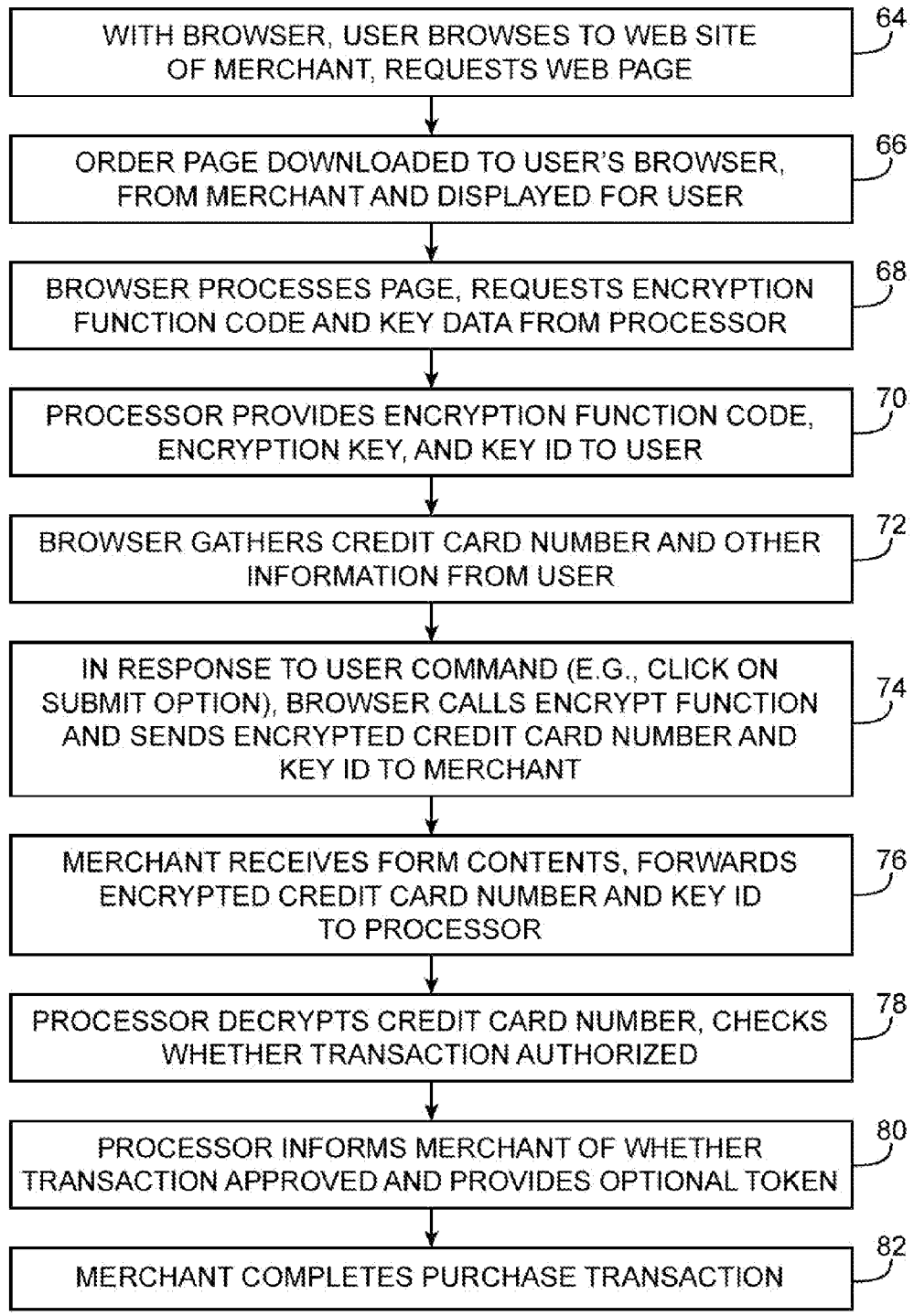
FIG. 4 is a flow chart of illustrative steps that may be used in operating a system of the type shown in FIG. 1 in accordance with an embodiment of the present invention.

Illustrative steps involved in using a system of the type shown in FIG. 1 are shown in FIG. 4. With the approach of FIG. 4, the user's browser can obtain a product ordering web page from a merchant that contains JavaScript. JavaScript security rules (in particular the same origin policy) prevent a browser that has obtained a web page from a first domain (i.e., the merchant's server) from interfacing with other domains (e.g., a key server).

There are exceptions to the same origin policy. For example, there is an exception to the same origin policy for images. Another exception to the same origin policy relates to requesting JavaScript functions from other domains (e.g., JavaScript libraries). Using this approach, JavaScript code corresponding to the encryption engine and key data can be requested from processor 24 without violating JavaScript security rules.

The techniques illustrated in FIG. 4 allow a user to use a JavaScript-enabled browser to obtain a key, use that key to encrypt sensitive information locally at the user's browser, and provide the merchant with access only to the encrypted version of the sensitive information.

As shown in FIG. 4, a user may use web browser 12 to browse to the web site of merchant 18 (step 64). When the user is ready to place and order, browser 14 requests one or more ordering web pages such as web page 34 of FIG. 2 from web server and order processing engine 20 over communications network 22.

At step 66, the requested ordering web page is provided to browser 14 at user 12 from merchant 18 over network 22. Browser 14 displays the web page for the user (e.g., on a monitor associated with user computing equipment 12).

At step 68, browser 14 may use JavaScript engine 16 to process the downloaded page. In particular, JavaScript engine 16 may process code such as the code in the illustrative web page of FIG. 3 (corresponding to displayed page 34 of FIG. 2). In processing the code of FIG. 3, JavaScript engine 16 requests that processor 24 provide documents containing the code for encryption function "DoEncrypt" (encryption engine code 30 of FIG. 1) and the key and key ID (from key source 26) over communications network 22.

At step 70, in response to the requests from JavaScript engine 16, processor 24 provides encryption function code 30, the cryptographic key, and the corresponding key ID to browser 14.

At step 72, browser 14 gathers input from the user at user computing equipment 12. For example, browser 14 may use text input boxes and other user input interfaces to gather credit card numbers and other information from the user. The user may, as an example, use a computer keyboard or a soft "on-screen" keyboard to type in desired characters. Voice recognition arrangements and other user input interfaces may also be used. When the user has finished entering the credit card information and other information and is ready to submit this information to merchant 18 (e.g., to place an order for a product), the user may direct browser 14 to upload the order (e.g., by clicking on submit order button 40 of FIG. 2 or otherwise selecting an appropriate option).

At step 74, in response to receiving the user's command to submit the order, browser 14 calls the encryption function corresponding to code 30 from processor 24 (called "DoEncrypt" in the present example). The encryption function takes unencrypted information such as an unencrypted (plaintext) version of the credit card number entered by the user and the key as inputs and supplies an encrypted version of the credit card number (and/or other sensitive information) as an output. During the operations of step 74, the encrypted output (i.e., the encrypted credit card number and other encrypted information) and the key ID are uploaded to web server and order processing engine 20 at merchant 18.

At step 76, the merchant uses web server and order processing engine 20 to receive the uploaded encrypted credit card number information and other encrypted information and the uploaded key ID. The merchant uses the uploaded information such as the encrypted credit card number and the key ID in formulating a request for authorization by processor 24. The authorization request may include, for example, the credit card number (complete or partial PAN), a CVV, an expiration date, the user's telephone number, the amount of the desired purchase (e.g., the dollar amount), and other information related to the purchase transaction.

Items of information that were encrypted by the user such as the credit card number and other sensitive information are not accessible by the merchant in unencrypted form, but rather are forwarded by the merchant to the processor in encrypted form as part of the authorization request. The authorization request is preferably accompanied by the key ID to allow the processor to identify which key should be used in decrypting the encrypted information in the authorization request. By identifying each key with a corresponding key ID, the system is able to assign a unique key to each purchase transaction. This prevents insecure situations that might arise if multiple users had access to the same encryption key.

At step 78, the processor receives the purchase transaction authorization request (sometimes referred to as a credit card authorization request) from the merchant over network 22. The processor (e.g., authentication service 32) may use the key ID to determine which key was used in encrypting the encrypted information. The processor may, for example, provide the key ID to key source 26. Key source 26 may use an internal key generator to regenerate the appropriate key from a master secret and the key ID. If desired, key source 26 may maintain a database list of each key that is generated and its corresponding key ID. With this type of arrangement, key source 26 may use the key ID to retrieve the appropriate key for performing decryption operations on the encrypted information associated with the authorization request.

After obtaining the appropriate key to use in performing decryption operations, decryption engine 28 may decrypt the encrypted credit card number and other encrypted information. The unencrypted credit card number and other unencrypted information from the authorization request may then be used in determining whether or not the processor should authorize the purchase transaction. In determining whether or not the user is authorized to make the desired purchase with the credit card, the processor may consult online databases (e.g., databases associated with credit card companies). Processor 24 may serve as a third-party clearinghouse for multiple credit card companies or may be associated with a particular credit card company (as examples).

At step 80, processor 24 may inform merchant 18 of whether the purchase transaction is authorized. If desired, processor 24 may also provide merchant 18 with a token that identifies an approved credit card number for the merchant. The merchant can retain the token for later use in transactions involving the same credit card. If the purchase transaction is not authorized (e.g., when the user's card is declined due to insufficient credit), the processor can inform the merchant accordingly. The merchant can then take appropriate action (e.g., by notifying the user via browser 14). If the processor informs the merchant that the transaction is authorized, the merchant can complete the user's purchase transaction (step 82). The merchant may, for example, confirm the purchase with the user and deliver the purchased product to the user (online, via physical shipment, etc.).

Figure 5:
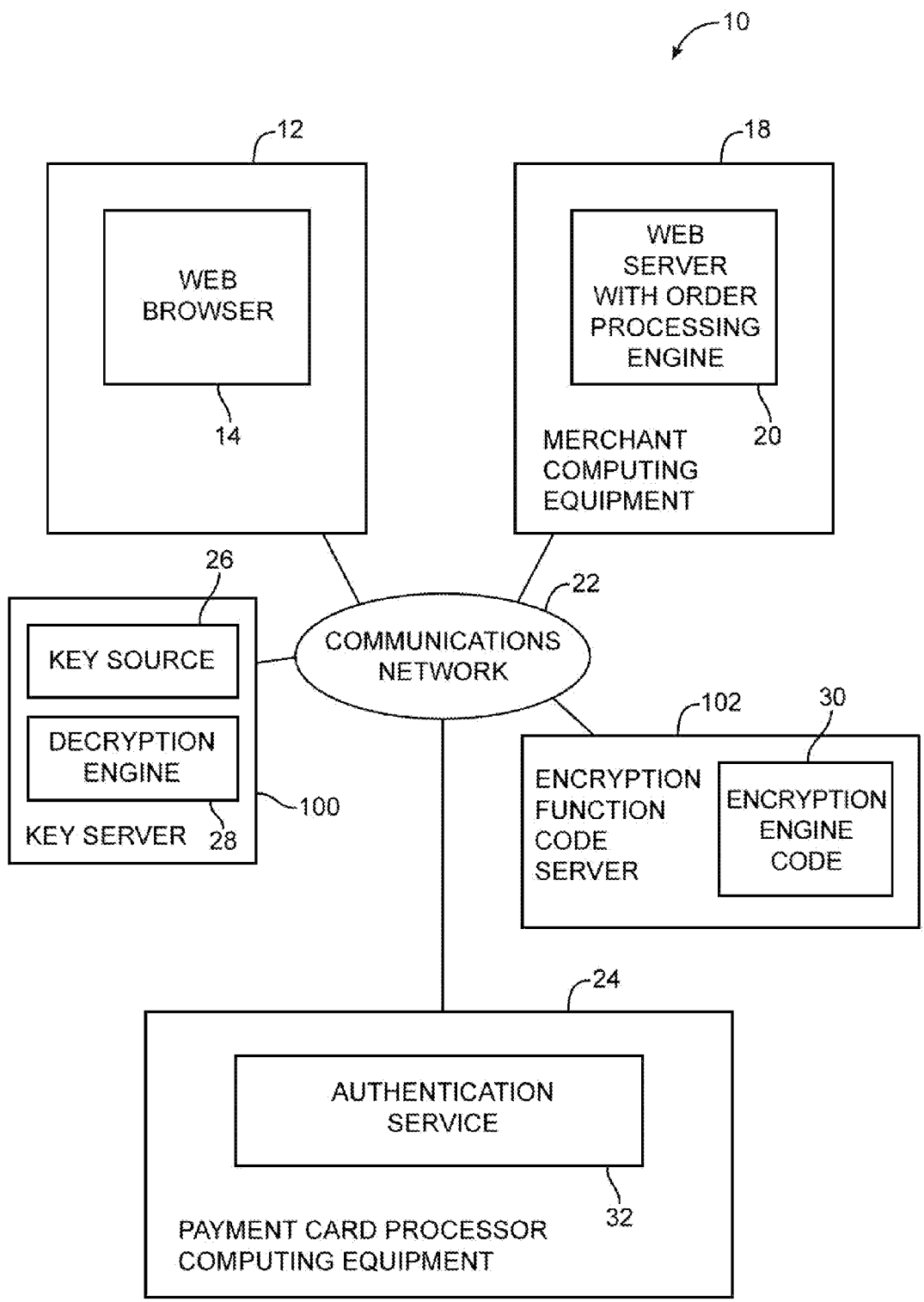
FIG. 5 is a system diagram of illustrative equipment involved in processing an online purchase transaction showing how key serving and encryption function code serving functions may optionally be performed using equipment separate from payment card processor computing equipment in accordance with an embodiment of the present invention.

If desired, key serving and/or encryption function code serving functions may be performed using equipment that is separate from payment card processor computing equipment 24. As shown in FIG. 5, for example, key server 100 may include key source 26 for providing encryption keys and may include decryption engine 28 for decrypting encrypted credit card information. Key server 100 may be associated with a trusted third party, may be associated with a payment card processor (e.g., key server 100 may be implemented using the resources of payment card processor computing equipment 24), may be associated with a trusted portion of merchant computing equipment 18 at a merchant (e.g., a trusted server associated with the merchant that is separate from an order processing server associated with the merchant), or may be associated with any other entity or computing equipment.

Encryption engine code 30 may be stored at encryption function code server 102. Server 102 may be associated with a trusted third party, may be associated with a payment card processor (e.g., server 102 may be implemented using the resources of payment card processor computing equipment 24), may be associated with the merchant operating equipment 18 (e.g., server 102 may be operated on equipment 18 or other equipment associated with the merchant), or may be associated with any other entity or computing equipment.

As an example, server 102 may be implemented on a server associated with the merchant to provide encryption function code from the merchant to the user's web browser, whereas key server 100 may be implemented at payment card processor 24 (as shown in FIG. 1). Other configurations in which key server 100 and encryption function code server 102 are implemented on other combinations of equipment such as equipment 24, equipment 18, and other equipment in system 10 may be used if desired. An advantage of implementing server 102 separately from payment card processor computing equipment 24 is that this type of arrangement may remove some of the load from payment card processor 24 (which might then be responsible only for handling the key and key identifier).

Although servers 100 and 102 in FIG. 5 are shown as being separate from equipment 24 and equipment 18, servers 100 and 102 may, for example, be operated using separate computing equipment, using computing equipment 18 and/or computing equipment 24, or may be operated using other suitable computing equipment. For example, servers 100 and 102 may be implemented on equipment 24 as described in connection with FIG. 1, or, if desired, only server 100 or only server 102 may be implemented on equipment 24. The functions of server 100 and 102 may be implemented on the same computing equipment (e.g., as part of the same server) or may each be implemented on separate computing equipment.

Figure 6:
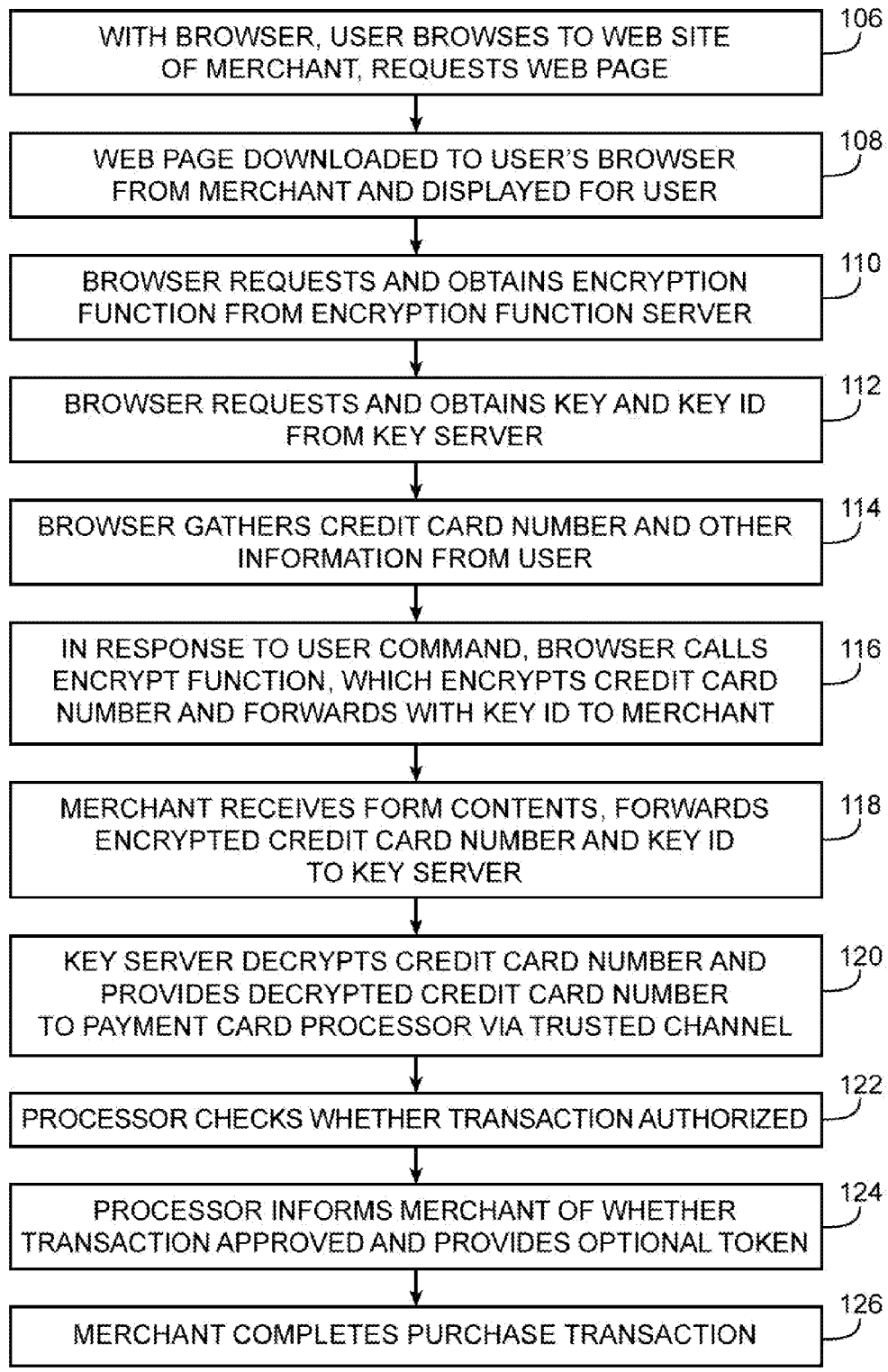
FIG. 6 is a flow chart of illustrative steps that may be used in operating a system of the type shown in FIG. 5 in accordance with an embodiment of the present invention.

FIG. 6 is a flow chart of illustrative steps that may be used in operating a system of the type shown in FIG. 5.

As shown in FIG. 6, a user may use web browser 12 to browse to the web site of an entity such as merchant 18 (step 106). When the user is ready to place an order or to otherwise interact with the web pages associated with the web site, browser 14 may request one or more ordering web pages (or other web pages) such as web page 34 of FIG. 2 from web server and order processing engine 20 over communications network 22.

At step 108, the requested ordering web page (or other web page) may be provided to browser 14 at user 12 from merchant 18 over network 22. Browser 14 displays the web page for the user (e.g., on a monitor associated with user computing equipment 12).

In response to browser 14 loading the web page, the page code on the web page that was obtained as part of the requested web page may request and obtain encryption function code 30 from encryption function code server 102 at step 110 and may obtain the key and a corresponding key identifier from key server 102 (step 112). Code 30 may be obtained from a server such as server 102 that is associated with the merchant and computing equipment associated with web server 20, may be associated with third party computing equipment such as a stand-alone server computer, or may be associated with transaction processor equipment 24 (as examples).

At step 116, browser 14 gathers input from the user at user computing equipment 12. For example, browser 14 may use text input boxes and other user input interfaces to gather credit card numbers and other information from the user. The user may, as an example, use a computer keyboard or a soft "on-screen" keyboard to type in desired characters. Voice recognition arrangements and other user input interfaces may also be used. When the user has finished entering the credit card information and other information and is ready to submit this information to merchant 18 (e.g., to place an order for a product), the user may direct browser 14 to upload the order (e.g., by clicking on submit order button 40 of FIG. 2 or otherwise selecting an appropriate option).

At step 116, in response to receiving the user's command to submit the order, browser 14 calls the encryption function corresponding to code 30. The encryption function takes unencrypted information such as an unencrypted (plaintext) version of some or all of the credit card number entered by the user and the key as inputs and supplies an encrypted version of the credit card number information (and/or other sensitive information) as an output. During the operations of step 116, the encrypted output (i.e., the encrypted credit card number information and other encrypted information) and the key identifier may be uploaded over communications network 22 (e.g., to web server and order processing engine 20 at merchant 18).

At step 118, the merchant uses web server and order processing engine 20 to receive the uploaded encrypted credit card number information and other encrypted information and the uploaded key identifier (ID). The merchant uses the uploaded information such as the encrypted credit card number and the key ID in formulating a request for authorization by processor 24. The authorization request may include, for example, credit card number information (complete or partial PAN), a CVV, an expiration date, the user's telephone number, the amount of the desired purchase (e.g., the dollar amount), and other information related to the purchase transaction.

In the example of FIGS. 1 and 4, the merchant provided the encrypted credit card information directly to payment card processor 24. In the example of FIGS. 5 and 6, in contrast, the merchant uploads the encrypted credit card information and key ID to key server 100. At step 120, the key server uses the key ID to look up or otherwise generate the appropriate key corresponding to the key ID and uses the key to decrypt the encrypted credit card number. The key server may then provide the decrypted credit card number or other sensitive information to payment card processor 24 over a secure link (step 120).

The functions of key server 26 may be implemented using a trusted server associated with the merchant, using equipment associated with server 102, at a trusted third party server, or at equipment 24 (as examples).

Items of information that were encrypted by the user such as credit card number information and other sensitive information are not accessible at insecure portions of the merchant (such as engine 20) in unencrypted form, but rather are forwarded by the merchant to key server 100 in encrypted form in connection with the authorization request. The key server may forward the authorization request to the processor with the decrypted credit card number or, if desired, information associated with the authorization request may be provided to the payment card processor by the merchant while the merchant directs key server 100 to decrypt the credit card number for the payment card processor.

The decryption request that is made to key server 100 by the merchant is preferably accompanied by the key ID to allow the key server to identify which key should be used in decrypting the encrypted credit card number information. By identifying each key with a corresponding key ID, the system is able to assign a unique key to each purchase transaction. This avoids insecure situations that might arise if multiple users had access to the same encryption key.

At step 122, the unencrypted credit card number and other unencrypted information from the authorization request may be used by payment card processor 24 in determining whether or not payment card processor should authorize the purchase transaction. In determining whether or not the user is authorized to make the desired purchase with the credit card, the payment card processor may consult online databases (e.g., databases associated with credit card companies). Payment card processor 24 may serve as a third-party clearinghouse for multiple credit card companies or may be associated with a particular credit card company (as examples).

At step 124, payment card processor 24 may inform merchant 18 of whether the purchase transaction is authorized. If desired, payment card processor 24 may also provide merchant 18 with a token that identifies an approved credit card number for the merchant. The merchant can retain the token for later use in transactions involving the same credit card. If the purchase transaction is not authorized (e.g., when the user's card is declined due to insufficient credit), the processor can inform the merchant accordingly. The merchant can then take appropriate action (e.g., by notifying the user via browser 14). If the processor informs the merchant that the transaction is authorized, the merchant can complete the user's purchase transaction or other sensitive transaction (step 126). The merchant may, for example, confirm the purchase with the user and deliver the purchased product to the user (online, via physical shipment, etc.).

If desired, credit card number information may be encrypted using a format preserving encryption (FPE) encryption algorithm. When using FPE schemes, strings of a particular format may be encrypted to form encrypted strings in the same format (or other designated format). For example, a string of sixteen digits each having values of 0-9 may be encrypted by an FPE algorithm to produce a ciphertext string of sixteen digits that likewise each have values of 0-9. An example of an FPE algorithm is the FFX mode of AES. Moreover, it may be desirable to embed data such as the key identifier (ID) within the encrypted credit card information, so that the key ID is automatically provided to an entity whenever the encrypted credit card information is provided.

Figure 7:
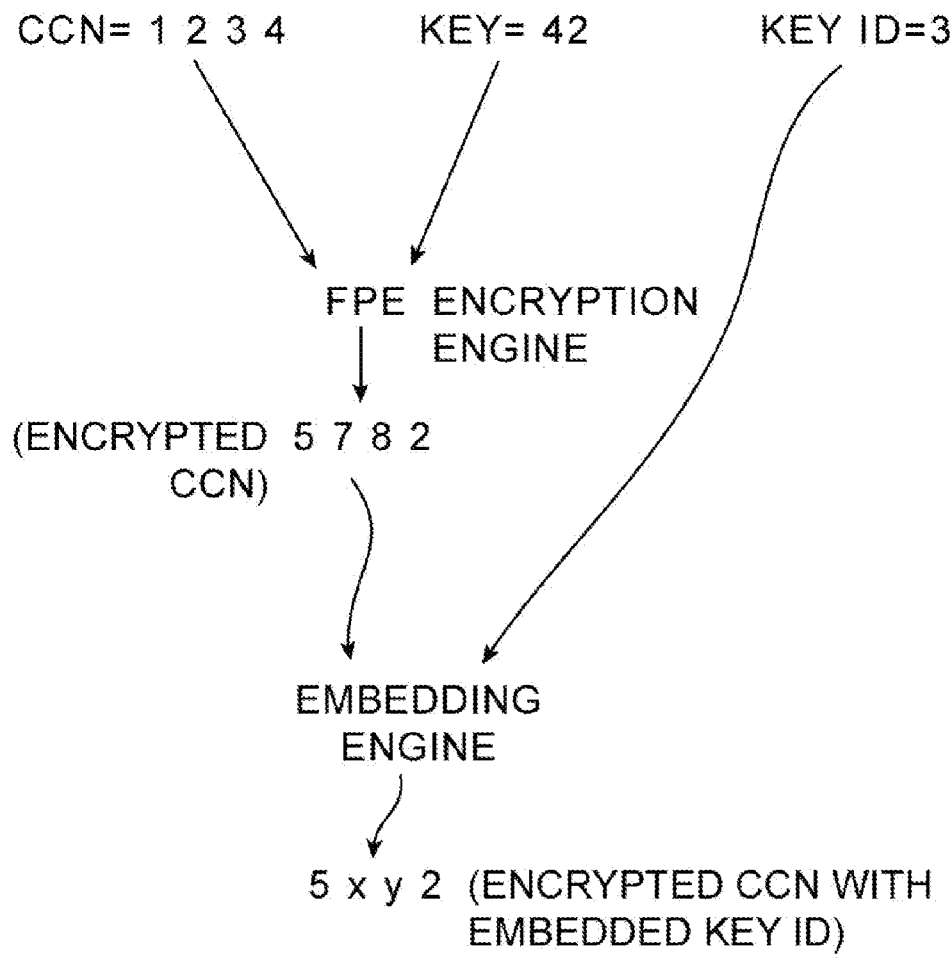
FIG. 7 is a diagram illustrating how a key identifier may be embedded into credit card number information when encrypting the credit card number information in accordance with an embodiment of the present invention.

FIG. 7 is a diagram showing how the encryption algorithm implemented by encryption engine code 30 may use format preserving encryption and key ID embedding techniques.

As shown in FIG. 7, information such as a credit card number (CCN) may be encrypted using an FPE algorithm and a cryptographic key to produce an encrypted CCN. The key ID may then be embedded into the CCN to form an encrypted credit card number with an embedded key ID. Any suitable data embedding operation may be used in the encryption algorithm to embed the key ID into the encrypted CCN. In the example of FIG. 7, the middle two digits of the CCN have been mapped into an enlarged space (e.g., digits 0-9 plus letters a-z). The enlarged space is larger than the original space in which the two middle digits were represented (digits 0-9), so additional information such as the key ID can be represented at the same time as the encrypted credit card information. As another example, the key ID may be embedded into the encrypted credit card number by appending (concatenating) the key ID onto the encrypted credit card output from the FPE algorithm.

Figure 8:
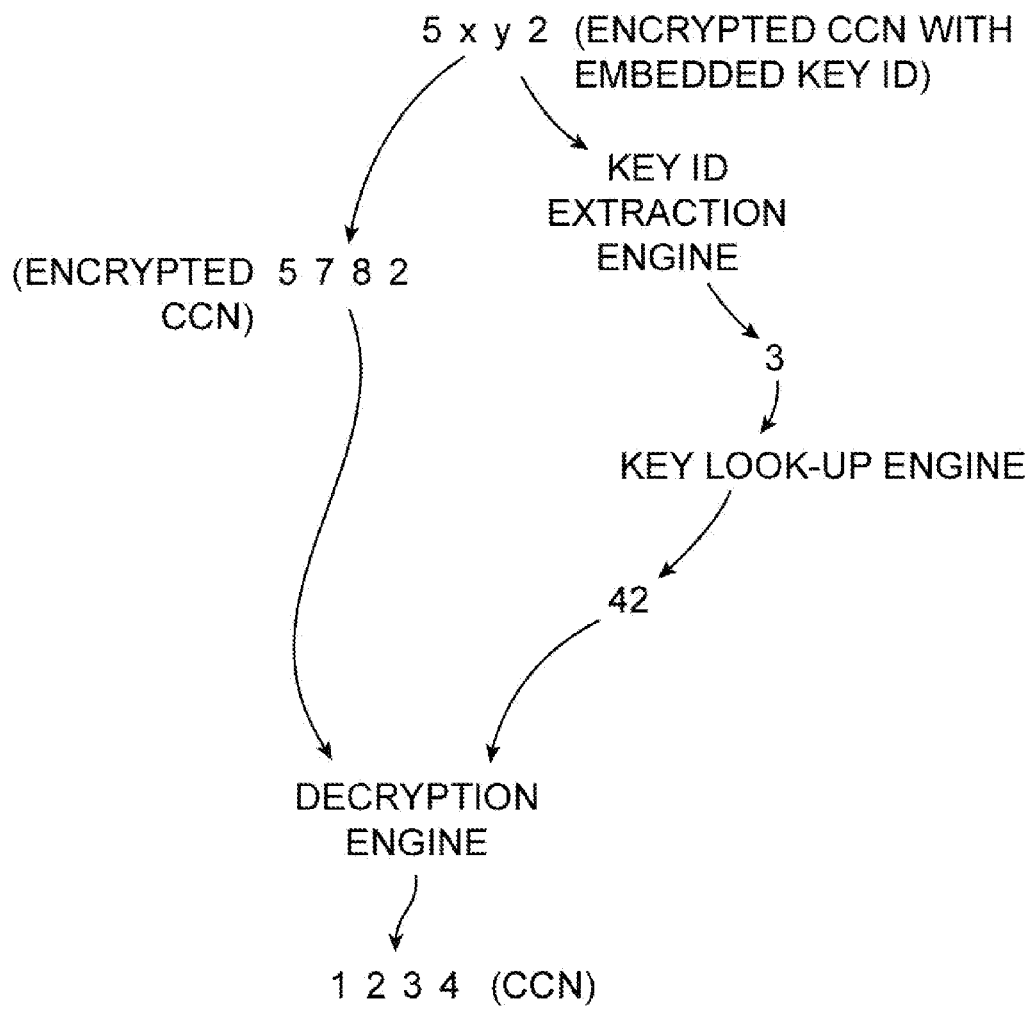
FIG. 8 is a diagram illustrating how the key identifier of FIG. 7 may be extracted from the encrypted card number information and used to identify which key is to be used to decrypt the encrypted credit card number information in accordance with an embodiment of the present invention.

FIG. 8 shows how the encrypted credit card number with embedded key ID information of FIG. 7 may be decrypted using decryption engine 28.

Initially, the encrypted credit card number with embedded key ID is processed by a key ID extraction engine. This function extracts key ID from the rest of the encrypted credit card information. A key lookup engine or other key generation function may use the key ID to obtain the key corresponding to the key ID. With the key, the decryption engine can complete the process of decrypting the encrypted credit card number to produce the decrypted version of the credit card number.

The foregoing is merely illustrative of the principles of this invention and various modifications can be made by those skilled in the art without departing from the scope and spirit of the invention.

What is claimed is:

1. A method in which a user at user computing equipment uses a web browser in completing an online purchase transaction with merchant computing equipment over a communications network, comprising:

receiving, by the web browser at the user computing equipment, a key requesting code, an encryption function requesting code, and a user information accepting code from a server;

requesting, by the web browser at the user computing equipment, a cryptographic key from a payment card processor computing equipment using the received key requesting code;

requesting, by the web browser at the user computing equipment, an encryption function code from the payment card processor computing equipment using the encryption function requesting code;

receiving, by the web browser at the user computing equipment, the requested cryptographic key from the payment card processor computing equipment;

receiving, by the web browser at the user computing equipment, the requested encryption function code from the payment card processor computing equipment;

receiving, by the web browser at the user computing equipment, credit card number data from the user using the received user information accepting code;

executing, by the web browser at the user computing equipment, the received encryption function code;

encrypting, by the web browser at the user computing equipment, the received credit card number data using the executed encryption function code and the received cryptographic key;

receiving, by the merchant computing equipment, the encrypted credit card number data from the web browser at the user computing equipment;

transmitting, by the merchant computing equipment, the received encrypted credit card number data to the payment card processor computing equipment;

receiving, by the payment card processor computing equipment, a purchase transaction authorization request from the merchant computing equipment, wherein the purchase transaction authorization request contains the encrypted credit card number data;

decrypting, by the payment card processor computing equipment, the encrypted credit card number data contained in the purchase transaction authorization request using the cryptographic key [V1];

determining, by the payment card processor computing equipment, whether use of a credit card corresponding to the credit card number data in the online purchase transaction is valid, based at least partly on the credit card number decrypted using the cryptographic key; and based on a determination that the use of a credit card corresponding to the credit card number data in the online purchase transaction is valid, authorizing, by the payment card processor computing equipment, the use of the credit card in the online purchase transaction.

2. The method defined in claim 1 further comprising:
transmitting, by the payment card processor computing equipment, a key identifier to the web browser over the communications network.

3. The method defined in claim 2 wherein receiving the purchase transaction authorization request comprises receiving the key identifier from the merchant.

4. The method defined in claim 2 further comprising:
transmitting, by a key source at the payment card processor computing equipment, the key identifier to the web browser over the communications network.

5. The method defined in claim 4 wherein the key source comprises a key generator that generates the cryptographic key.

6. The method defined in claim 1 further comprising:
transmitting, by a key server that is separate from the payment card processor computing equipment, a key identifier and the cryptographic key to the web browser over the communications network.

7. A method for conducting online purchases, comprising:
transmitting, by a web server at merchant computing equipment, at least one ordering web page over the communications network to a web browser running on user computing equipment, wherein the ordering web page includes a key requesting code, an encryption function requesting code, and a user information accepting code;

requesting, by the web browser running on the user computing equipment, a cryptographic key from a different server over the communications network using the key requesting code;

requesting, by the web browser running on the user computing equipment, an encryption function code from the different server over the communications network using the encryption function requesting code;

receiving, by the web browser running on the user computing equipment, the requested cryptographic key from the different server;

receiving, by the web browser running on the user computing equipment, the requested encryption function code from the different server;

receiving, by the web browser, credit card information from a user using the user information accepting code in the transmitted ordering web page at the web browser running on the user computing equipment;

executing, by the web browser running on the user computing equipment, the received encryption function code;

encrypting, by the web browser running on the user computing equipment, the credit card information using the executed encryption function code and the received cryptographic key;

receiving, by the merchant computing equipment, the encrypted credit card information from the web browser running on the user computing equipment over the communications network;

transmitting, by the merchant computing equipment, the encrypted credit card information to the different server;

decrypting, by the different server, the encrypted credit card information using the cryptographic key; and determining, by the different server, whether to authorize use of a credit card corresponding to the credit card information for use in the online purchase based at least partly on the credit card information decrypted using the cryptographic key.

8. The method defined in claim 7 wherein the communications network includes the internet, wherein the code that requests the cryptographic key comprises a JavaScript command that retrieves the cryptographic key and an associated key identifier from a key source at the different server, and wherein providing the ordering web page comprises providing an ordering web page that includes the JavaScript command to the web browser over the internet.

9. The method defined in claim 7 wherein the ordering web page includes a Cascading Style Sheet command that requests the cryptographic key and a key identifier associated with the cryptographic key from the different server over the communications network.

10. The method defined in claim 9 wherein providing the ordering web page further comprises providing an ordering web page over the communications network to the web browser running on user computing equipment that includes code that incorporates by reference into the ordering web page encryption function code from the different server over the communications network.

11. A method for conducting online purchases in a system that includes user computing equipment, that includes a first server that communicates with the user computing equipment over a communications network, and that includes a second server, comprising:
receiving, by a web browser at the user computing equipment, at least one web page from the first server over the communications network, wherein the at least one web page includes a key requesting code, an encryption function requesting code, and a user information accepting code;

requesting, by the web browser at the user computing equipment, a cryptographic key from the second server over the communications network using the received key requesting code;

requesting, by the web browser at the user computing equipment, an encryption function code from a remote server over the communications network using the received encryption function requesting code;

receiving, by the web browser at the user computing equipment, the requested cryptographic key from the second server;

receiving, by the web browser at the user computing equipment, the requested encryption function code from the remote server;

receiving, by the web browser, payment card information from a user using the received user information accepting code in the at least one web page;

executing, by the web browser at the user computing equipment, the encryption function code;

encrypting, by the web browser at the user computing equipment, the payment card information using the executed encryption function code and the received cryptographic key;

receiving, by merchant computing equipment, the encrypted payment card information from the web browser and;

transmitting, by merchant computing equipment, the encrypted payment card information to payment card processor computing equipment;

decrypting, by the payment card processor computing equipment, the encrypted payment card information using the cryptographic key; and determining, by the payment card processor computing equipment, whether to authorize use of a payment card corresponding to the payment card information for use in the online purchase based at least partly on the payment card information decrypted using the cryptographic key.

12. The method defined in claim 11 wherein the first server comprises a web server associated with a merchant selling a product to the user, wherein the payment card information comprises credit card number information that includes at least part of a credit card number, and wherein the second server comprises a credit card processor server, the method further comprising:

receiving, at the web server associated with the merchant, an encrypted version of the credit card number information from the user computing equipment over the communications network; and submitting, at the web server associated with the merchant, a request to the credit card processor server over the communications network to authorize the credit card number information.

13. The method defined in claim 12 wherein submitting the request comprises submitting the encrypted credit card number information to the credit card processor server over the communications network with a key identifier that is associated with the cryptographic key.

14. The method defined in claim 13 wherein receiving the web page comprises receiving an ordering web page including JavaScript code that requests the key identifier from the credit card processor server over the communications network, including JavaScript code that requests encryption function code from the credit card processor server over the communications network, and including code that requests the cryptographic key from the credit card processor server.

15. The method defined in claim 13 wherein receiving the web page comprises receiving an ordering web page including Cascading Style Sheet code that requests the key identifier from the credit card processor server over the communications network, including code that requests encryption function code from the credit card processor server over the communications network, and including code that requests the cryptographic key from the credit card processor server.

16. The method defined in claim 11 wherein the payment card information comprises credit card number information that includes at least part of a credit card number and wherein receiving the web page comprises receiving a web page including code that requests encryption function code over the communications network, the method further comprising:

running, at the user computing equipment, the encryption function code to encrypt the credit card number information using a format preserving encryption operation.

17. The method defined in claim 16 further comprising:

running, at the user computing equipment, the encryption function code to encrypt the credit card number information using an encryption operation that embeds a key identifier that is associated with the cryptographic key into the encrypted credit card number information.

18. The method defined in claim 11 wherein the payment card information comprises credit card number information that includes at least part of a credit card number and wherein receiving the web page comprises receiving a web page including code that requests encryption function code over the communications network, the method further comprising:

running, at the user computing equipment, the encryption function code to encrypt the credit card number information using a one-time pad function.

19. The method defined in claim 11 wherein the payment card information comprises credit card number information that includes at least part of a credit card number and wherein receiving the web page comprises receiving a web page including code that requests encryption function code over the communications network, the method further comprising:

running, at the user computing equipment, the encryption function code to encrypt the credit card number information using a stream cipher in which a key stream is generated from the cryptographic key.

20. A method for conducting online transactions in a system that includes user computing equipment, a web server, a key server, an encryption function code server, and a transaction processor, comprising:

receiving, by a web browser at the user computing equipment, at least one web page from the web server over a communications network, wherein the at least one web page includes code that requests a cryptographic key from the key server over the communications network, includes a key requesting code, an encryption function requesting code, and a user information accepting code;

requesting, by the web browser at the user computing equipment, a cryptographic key from the key server over the communications network using the received key requesting code;

requesting, by the web browser at the user computing equipment, an encryption function code from the encryption function code server over the communications network using the received encryption function requesting code;

receiving, by the web browser at the user computing equipment, the requested cryptographic key from the key server;

receiving, by the web browser at the user computing equipment, the requested encryption function code from the encryption function code server;

receiving, by the web browser at the user computing equipment, sensitive information from a user using the received user information accepting code;

executing, by the web browser, the received encryption function code;

encrypting, by the web browser at the user computing equipment, the sensitive information using the executed encryption function code and the received cryptographic key;

receiving, by merchant computing equipment, the encrypted sensitive information from the web browser;

transmitting, by the merchant computing equipment, the encrypted sensitive information to payment card processor computing equipment;

decrypting, by the payment card processor computing equipment, the encrypted sensitive information using the cryptographic key; and determining, by the payment card processor computing equipment, whether to authorize use of a credit card corresponding to the sensitive information for use in the online transaction based at least partly on the sensitive information decrypted using the cryptographic key.

21. The method defined in claim 20 further comprising:

encrypting, by the web browser at the user computing equipment, the sensitive information using the encryption function code and the cryptographic key.

22. A method for conducting online transactions in a system that includes user computing equipment, a web server, a transaction processor with a key source, and an encryption function code server that is separate from the transaction processor, comprising:

receiving, by a web browser at the user computing equipment, at least one web page from the web server over a communications network, wherein the at least one web page includes a key requesting code, an encryption function requesting code, and user information accepting code;

requesting, by the web browser at the user computing equipment, a cryptographic key from the key source at the transaction processor over the communications network using the received key requesting code;

requesting, by the web browser at the user computing equipment, an encryption function code from the encryption function code server over the communications network using the received encryption function requesting code;

receiving, by the web browser at the user computing equipment, the requested cryptographic key from the key source;

receiving, by the web browser at the user computing equipment, the requested encryption function code from the encryption function code server;

receiving, by the web browser at the user computing equipment, sensitive information from a user using the received user information accepting code;

executing, by the web browser at the user computing equipment, the received encryption function code;

encrypting, by the web browser at the user computing equipment, the sensitive information using the executed encryption function code and the cryptographic key;

receiving, by the merchant computing equipment, the encrypted sensitive information from the web browser;

transmitting, by the merchant computing equipment, the encrypted sensitive information to payment card processor computing equipment;

decrypting, by the payment card processing computing equipment, the encrypted sensitive information using the cryptographic key; and determining, by the payment card processing computing equipment, whether to authorize use of a credit card corresponding to the sensitive information for use in the online transaction based at least partly on the sensitive information decrypted using the cryptographic key.

23. The method defined in claim 22 wherein the transaction processor comprises a credit card processor, wherein receiving the web page comprises receiving at least one web page that includes code that requests a key identifier from the key source at the credit card processor, and wherein the key identifier corresponds to the cryptographic key.

24. The method defined in claim 23 wherein the encryption function code server and the web server are associated with a merchant and wherein receiving the web page comprises receiving at least one web page that includes code that requests the encryption function code from the encryption function code server associated with the merchant over the communications network.

* * * * *